United States Patent
Nakagawara

(10) Patent No.: US 10,027,907 B2
(45) Date of Patent: Jul. 17, 2018

(54) IMAGE PICKUP DEVICE HAVING UNIT PIXELS ARRANGED IN TWO-DIMENSIONAL MATRIX FORM EACH OF WHICH HAS PIXELS OF DIFFERENT SENSITIVITIES, CONTROL METHOD THEREFOR, STORAGE MEDIUM STORING CONTROL PROGRAM THEREFOR, AND SIGNAL PROCESSING DEVICE FOR IMAGE PICKUP DEVICE

(71) Applicant: CANON KABUSHIKI KAISHA, Tokyo (JP)

(72) Inventor: Naoyuki Nakagawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/712,224

(22) Filed: May 14, 2015

(65) Prior Publication Data
US 2015/0341577 A1 Nov. 26, 2015

(30) Foreign Application Priority Data

May 21, 2014 (JP) .................................. 2014-105213

(51) Int. Cl.
*H04N 5/355* (2011.01)
*H04N 5/235* (2006.01)
(Continued)

(52) U.S. Cl.
CPC ......... *H04N 5/35563* (2013.01); *G06T 7/507* (2017.01); *H04N 5/2355* (2013.01);
(Continued)

(58) Field of Classification Search
None
See application file for complete search history.

(56) References Cited

U.S. PATENT DOCUMENTS 6,137,100 A * 10/2000 Fossum .................. H04N 9/045
250/208.1
6,867,549 B2 * 3/2005 Cok ..................... G09G 3/3216
315/169.3
(Continued)

FOREIGN PATENT DOCUMENTS

CN 103024304 A 4/2013
CN 103650480 A 3/2014
(Continued)

OTHER PUBLICATIONS

Office Action dated Oct. 31, 2017, in Chinese Patent Application No. 201510262428.8.
(Continued)

*Primary Examiner* — Roberto Velez
*Assistant Examiner* — Quan Pham
(74) *Attorney, Agent, or Firm* — Fitzpatrick, Cella, Harper & Scinto

(57) ABSTRACT

An image pickup device that is capable of performing shading correction with sufficient accuracy even if data volume for the shading correction is reduced. The image pickup device includes a plurality of unit pixels arranged in a two-dimensional matrix form. Each of the plurality of unit pixels includes a plurality of first sensitivity pixels having a first sensitivity, and at least one second sensitivity pixel having a second sensitivity different from the first sensitivity. The first and second sensitivity pixels are arranged so that a centroid position of the second sensitivity pixel approximately coincides with the centroid position of the first sensitivity pixels.

12 Claims, 10 Drawing Sheets

(51) Int. Cl.
   *H04N 5/335* (2011.01)
   *H04N 5/341* (2011.01)
   *H04N 5/357* (2011.01)
   *G06T 7/507* (2017.01)
   *H04N 5/369* (2011.01)
   *H04N 101/00* (2006.01)

(52) U.S. Cl.
   CPC ............. *H04N 5/335* (2013.01); *H04N 5/341* (2013.01); *H04N 5/3572* (2013.01); *H04N 5/369* (2013.01); *G06T 2207/10004* (2013.01); *G06T 2207/10024* (2013.01); *G06T 2207/10028* (2013.01); *H04N 2101/00* (2013.01)

(56) References Cited

U.S. PATENT DOCUMENTS

| | | | |
|---|---|---|---|
| 6,885,398 B1* | 4/2005 | Sladen | H04N 9/045 348/234 |
| 6,956,605 B1* | 10/2005 | Hashimoto | H01L 27/14609 250/208.1 |
| 7,538,805 B2 | 5/2009 | Kubo | |
| 7,692,693 B2* | 4/2010 | Misawa | H04N 3/155 348/229.1 |
| 7,982,786 B2* | 7/2011 | Nishida | G02B 5/008 348/272 |
| 8,259,189 B2 | 9/2012 | Sambongi | |
| 8,890,991 B2 | 11/2014 | Sekine | |
| 8,908,073 B2 | 12/2014 | Minagawa et al. | |
| 9,036,052 B2 | 5/2015 | Awatani | |
| 9,172,892 B2* | 10/2015 | Dokoutchaev | H04N 5/2254 |
| 9,344,637 B2 | 5/2016 | Kasai et al. | |
| 9,369,681 B1* | 6/2016 | Wu | H04N 9/045 |
| 9,661,306 B2 | 5/2017 | Hirota | |
| 2002/0015110 A1* | 2/2002 | Brown Elliott | G09G 3/3607 348/589 |
| 2004/0125226 A1* | 7/2004 | Kubo | H04N 5/3572 348/340 |
| 2005/0041138 A1* | 2/2005 | Suzuki | H04N 5/235 348/362 |
| 2007/0171290 A1* | 7/2007 | Kroger | G06T 3/4015 348/272 |
| 2009/0109307 A1 | 4/2009 | Nishida et al. | |
| 2009/0152664 A1* | 6/2009 | Klem | H01L 27/14603 257/440 |
| 2011/0019004 A1* | 1/2011 | Ohmori | H04N 9/045 348/164 |
| 2013/0076953 A1* | 3/2013 | Sekine | H04N 5/343 348/311 |
| 2013/0120620 A1* | 5/2013 | Hara | H04N 5/202 348/251 |
| 2013/0161774 A1* | 6/2013 | Okigawa | G02B 3/0056 257/432 |
| 2014/0267828 A1* | 9/2014 | Kasai | H04N 9/045 348/229.1 |
| 2015/0256734 A1* | 9/2015 | Fukuhara | H04N 5/2355 348/294 |
| 2017/0318252 A1 | 11/2017 | Minagawa et al. | |

FOREIGN PATENT DOCUMENTS

| | | |
|---|---|---|
| JP | 2004-072382 A | 3/2004 |
| JP | 2010-283573 A | 12/2010 |
| JP | 2012-195921 A | 10/2012 |
| JP | 2013-055500 A | 3/2013 |
| JP | 2014-022931 A | 2/2014 |
| JP | 2014-075767 A | 4/2014 |

OTHER PUBLICATIONS

Office Action dated May 15, 2018, in Japanese Patent Application No. 2014-105213.

* cited by examiner

FIG. 4

| 19 | 17 | 14 | 7 | 5 | 7 | 14 | 17 | 19 |
|----|----|----|---|---|---|----|----|----|
| 17 | 13 | 8  | 4 | 3 | 4 | 7  | 13 | 17 |
| 14 | 9  | 4  | 2 | 0 | 2 | 4  | 8  | 14 |
| 15 | 9  | 5  | 3 | 1 | 3 | 5  | 9  | 15 |
| 18 | 14 | 8  | 5 | 4 | 5 | 8  | 14 | 18 |
| 20 | 18 | 15 | 8 | 6 | 8 | 15 | 18 | 20 |

IMAGE PICKUP DEVICE HAVING UNIT PIXELS ARRANGED IN TWO-DIMENSIONAL MATRIX FORM EACH OF WHICH HAS PIXELS OF DIFFERENT SENSITIVITIES, CONTROL METHOD THEREFOR, STORAGE MEDIUM STORING CONTROL PROGRAM THEREFOR, AND SIGNAL PROCESSING DEVICE FOR IMAGE PICKUP DEVICE

BACKGROUND OF THE INVENTION

Field of the Invention

The present invention relates to an image pickup device, such as a CCD or CMOS image sensor, a control method therefor, a storage medium storing a control program therefor, and a signal processing device for the image processing device, and is particular, relates to the image pickup device having unit pixels, each of which has pixels of different sensitivities, arranged in a two-dimensional matrix form.

Description of the Related Art

Conventionally, there is a known image pickup device that composites outputs of two or more pixels of different areas and outputs the combined signal as a signal of one unit pixel in order to expand a dynamic range (see Japanese Laid-Open Patent Publication (Kokai) No. 2010-283573 (JP 2010-283573A)).

FIG. 10 is a view showing a pixel arrangement of the image pickup device described in the above-mentioned publication.

As shown in FIG. 10, a unit pixel consists of two pixels that are different in area, and a plurality of unit pixels are arranged in a two-dimensional matrix form. A unit pixel 1103 is provided with a high sensitivity pixel (HIGH) 1101 and a low sensitivity pixel (LOW) 1102. A dynamic range is expanded by compositing or selecting the outputs of the high sensitivity pixel 1101 and low sensitivity pixel 1102.

On the other hand, in an image pickup apparatus, such as a digital still camera, it is known that an output of the image pickup device is affected by shading caused by peripheral darkening of an image pickup optical system, unevenness of sensitivity of an image pickup device, etc. Shading correction may be performed so that brightness of the whole image becomes uniform in order to prevent such shading. For example, a conversion property that converts an image obtained by photographing a uniform luminance surface that has uniform luminance distribution into a target output (i.e., an image) is found beforehand. At the time of photographing, shading of an image obtained by photographing is corrected using the conversion property concerned.

Incidentally, in the image pickup device shown in FIG. 10, the centroid position of the high sensitivity pixel differs from the centroid position of the low sensitivity pixel. Accordingly, shading correction data at the centroid positions of the high sensitivity pixels and shading correction data at the centroid positions of the low sensitivity pixels are needed in order to perform the shading correction with sufficient accuracy. Accordingly, the data volume for the shading correction becomes huge, which requires large memory capacity and increases processing load.

SUMMARY OF THE INVENTION

The present invention provides an image pickup device, a control method therefor, a storage medium storing a control program therefor, and a signal processing device therefor, which are capable of performing shading correction with sufficient accuracy even if data volume for the shading correction is reduced.

Accordingly, a first aspect of the present invention provides an image pickup device in which a plurality of unit pixels are arranged in a two-dimensional matrix form, each of the plurality of unit pixels comprising a plurality of first sensitivity pixels configured to have a first sensitivity, and at least one second sensitivity pixel configured to have a second sensitivity different from the first sensitivity and to be arranged so that a centroid position of the at least one second sensitivity pixel approximately coincides with the centroid position of the plurality of first sensitivity pixels.

Accordingly, a second aspect of the present invention provides a control method for an image pickup device in which a plurality of unit pixels, each of which includes a plurality of pixels that are different in sensitivity and are arranged so that centroid positions approximately coincide, are arranged in a two-dimensional matrix, the control method comprising a correction step of correcting pixel signals that are outputs of the pixels that are different in the sensitivity in the unit pixel based on preset common shading correction data, and a compositing step of receiving the pixel signals after shading correction in the correction step, and of compositing the pixel signals to use as an output of the unit pixel.

Accordingly, a third aspect of the present invention provides a non-transitory computer-readable storage medium storing a control program causing a computer to execute the control method of the second aspect.

Accordingly, a fourth aspect of the present invention provides a signal processing device that processes pixel signals that are outputs of an image pickup device in which a plurality of unit pixels, each of which includes a plurality of pixels that are different in sensitivity and are arranged so that centroid positions approximately coincide, are arranged in a two-dimensional matrix, the control method comprising a correction unit configured to correct the pixel signals that are outputs of the pixels that are different in the sensitivity in the unit pixel based on preset common shading correction data, and a compositing unit configured to receive the pixel signals after shading correction by the correction unit, and to composite the pixel signals to use as an output of the unit pixel.

According to the present invention, since the pixels are arranged so that the centroid positions of the pixels of different sensitivities coincide approximately, the shading corrections of the pixel signals are performed using common shading correction data. As a result, the shading correction is performed with sufficient accuracy even if the volume of the shading correction data is reduced.

Further features of the present invention will become apparent from the following description of exemplary embodiments with reference to the attached drawings.

BRIEF DESCRIPTION OF THE DRAWINGS

FIG. 4 is a view showing an example of shading correction data used in a shading correction circuit shown in FIG. 3.

DESCRIPTION OF THE EMBODIMENTS

Hereafter, embodiments according to the present invention will be described in detail with reference to the drawings.

Figure 1:
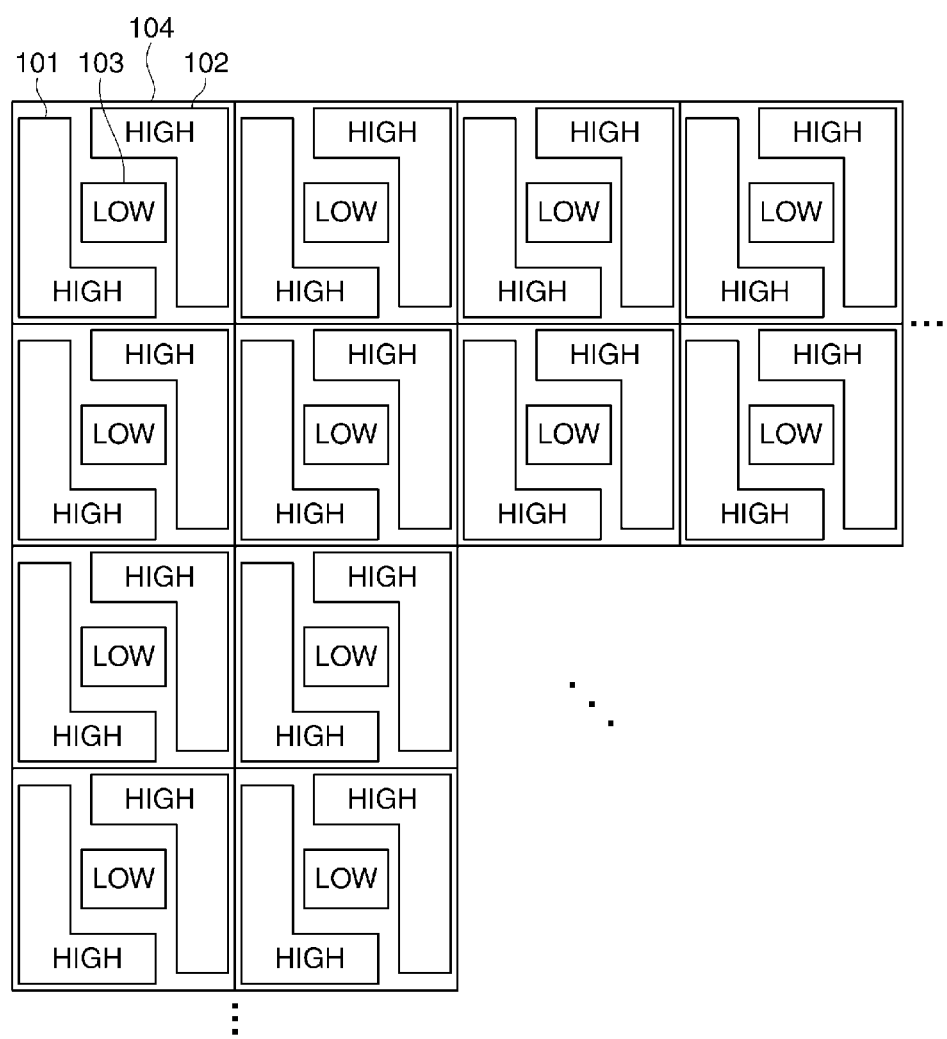
FIG. 1 is a view showing a pixel arrangement of an image pickup device according to a first embodiment of the present invention.

FIG. 1 is a view showing a pixel arrangement of an image pickup device according to a first embodiment of the present invention.

The illustrated image pickup device is a CCD or CMOS image sensor, for example, and is used in an image pickup apparatus, such as a digital still camera. In this image pickup device, high sensitivity pixels (HIGH) 101 and 102 and a low sensitivity pixel (LOW) 103, which are different in the areas of light receiving sections mutually, constitute a unit pixel 104. That is, the high sensitivity pixels 101 and 102 and the low sensitivity pixel 103, which are different in sensitivity mutually, are arranged in the unit pixel 104. The plurality of unit pixels 104 are arranged in a two-dimensional matrix form.

As illustrated, the high sensitivity pixels 101 and 102 have openings (i.e., light receiving sections) having the same areas, and are arranged at peripheries in the unit pixel 104. On the other hand, the low sensitivity pixel 103 is arranged at the center of the unit pixel 104.

That is, in the example shown in FIG. 1, the high sensitivity pixels 101 and 102 and the low sensitivity pixel 103 are arranged in the unit pixel 104 so that a centroid position of the high sensitivity pixels 101 and 102 (the centroid position of the united area of the high sensitivity pixel 101 and the high sensitivity pixel 102) approximately coincides with a centroid position of the low sensitivity pixel 103.

Figure 2:
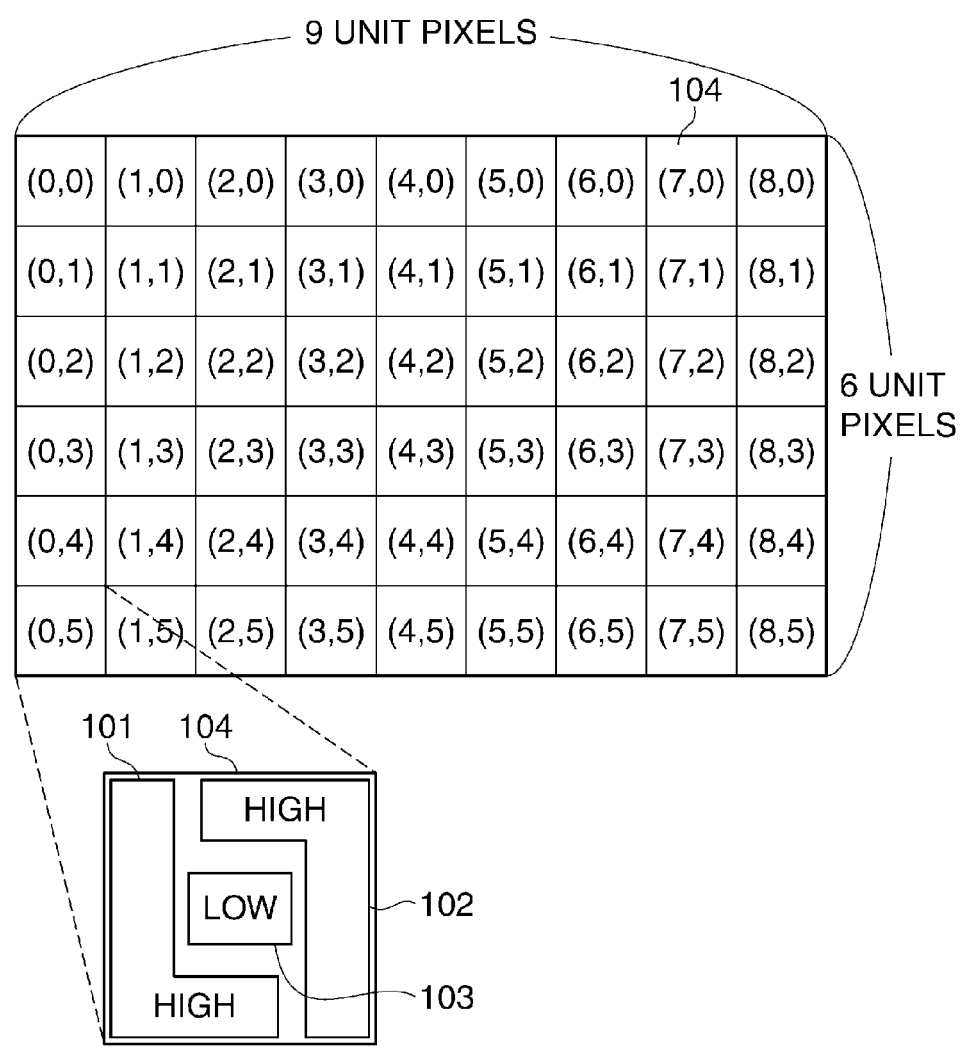
FIG. 2 is a view showing an image pickup device that has unit pixels of 9-row and 6-column as an example of the image pickup device shown in FIG. 1.

FIG. 2 is a view showing an image pickup device that has unit pixels of 9-row and 6-column as an example of the image pickup device shown in FIG. 1.

In the example shown in FIG. 2, the image pickup device that has 54 pieces (9-row and 6-column) in total of the unit pixels 104 is shown. An index that shows a row number and a column number is given to each of the unit pixels 104.

Figure 3:
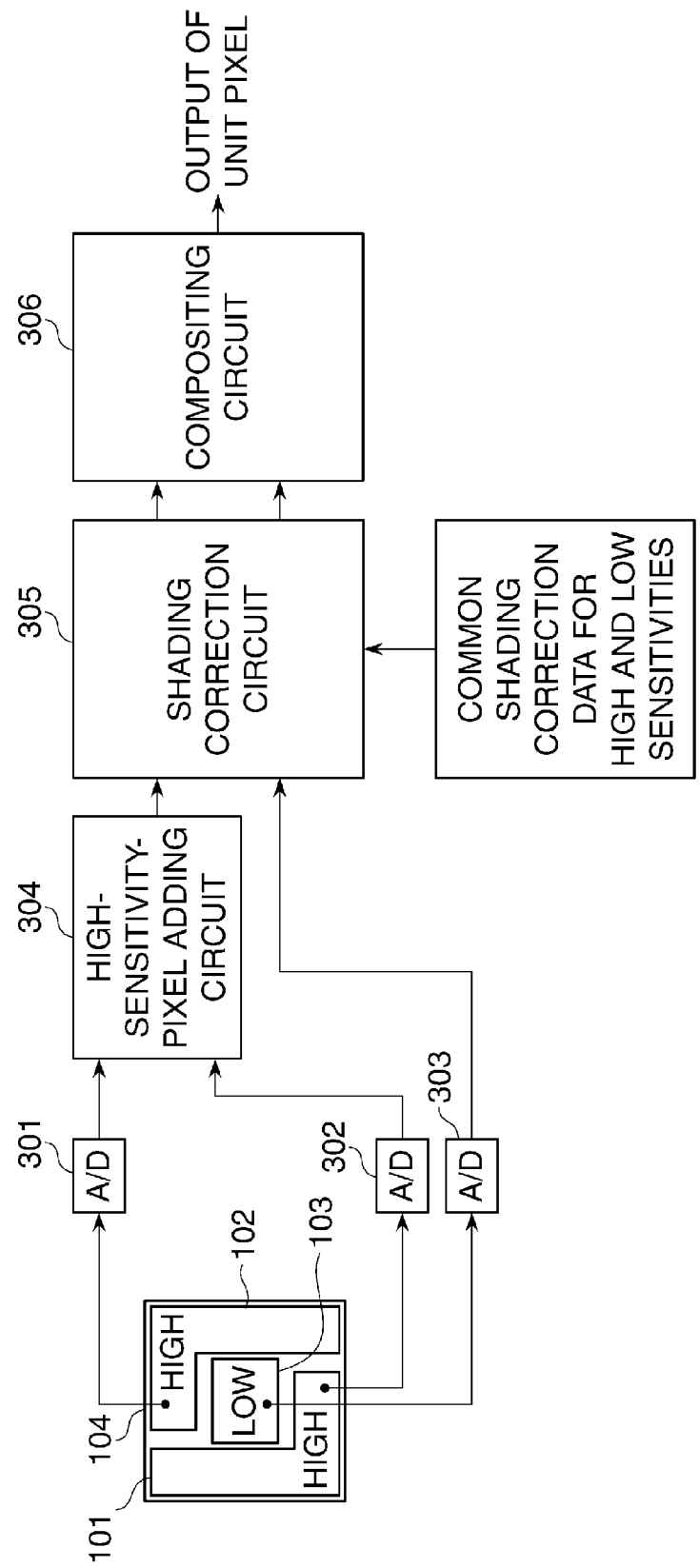
FIG. 3 is a block diagram schematically showing an example of a signal processing circuit with which the image pickup device shown in FIG. 2 is provided.

FIG. 3 is a block diagram schematically showing an example of a signal processing circuit with which the image pickup device shown in FIG. 2 is provided. It should be noted that the signal processing circuit for one unit pixel is shown in the illustrated example.

The signal processing circuit shown in FIG. 3 has A/D converters 301 through 303, a high-sensitivity-pixel adding circuit 304, a shading correction circuit 305, and a compositing circuit 306.

In the example shown in FIG. 3, photo diodes of the high sensitivity pixels 101 and 102 and the low sensitivity pixel 103 are provided with signal-charge reading gates (shown as black dots). The A/D converters (column A/D converters) 301, 302, and 303 are provided for every row and every opening.

The A/D converter 302 A/D-converts the pixel signal read from the high sensitivity pixel 101 (hereinafter referred to as a first high sensitivity pixel signal) to generate a first high-sensitivity-pixel digital signal. Similarly, the A/D converter 301 A/D-converts the pixel signal read from the high sensitivity pixel 102 (hereinafter referred to as a second high sensitivity pixel signal) to generate a second high-sensitivity-pixel digital signal. Moreover, the A/D converter 303 A/D-converts the low sensitivity pixel signal read from the low sensitivity pixel 103 to generate a low-sensitivity-pixel digital signal.

The first and second high-sensitivity-pixel digital signals are given to the high-sensitivity-pixel adding circuit 304. The high-sensitivity-pixel adding circuit 304 digitally adds the first and second high-sensitivity-pixel digital signals, and sends the high-sensitivity-pixel digital signal after addition to the shading correction circuit 305.

The high-sensitivity-pixel digital signal after addition and the low-sensitivity-pixel digital signal are given to the shading correction circuit 305. The shading correction circuit 305 performs shading corrections of the high-sensitivity-pixel digital signal after addition and the low-sensitivity-pixel digital signal using common shading correction data as follows.

FIG. 4 is a view showing an example of shading correction data used in the shading correction circuit 305 shown in FIG. 3.

The shading correction data shown in FIG. 4 shows degrees of peripheral darkening of an image pickup optical system in which the image pickup device shown in FIG. 2 is used.

When the shading correction data shown in FIG. 4 is generated, a predetermined uniform luminance surface is photographed, and the value of the brightest pixel is set to "0". Then, a light amount reduction of a target pixel with respect to the light amount of the brightest pixel concerned (a reference pixel) is shown by the count number. The count is written as a logarithm. For example, the count of a target pixel of which receiving light amount is half of that of the reference pixel becomes "8".

For example, since the shading correction data concerning the unit pixel (0, 0) shown in FIG. 2 is 19 count (see FIG. 4), the unit pixel (0, 0) receives the light amount of $(1/2)^{(19/8)}$ with respect to the light amount received by the reference pixel (4, 2). Accordingly, a factor of $2^{(19/8)}$ is multiplied by the outputs of the high sensitivity pixels 101 and 102, and by the output of the low sensitivity pixel 103 of the unit pixel (0, 0). Then, the shading correction is similarly performed for another unit pixel.

The compositing circuit 306 selects a signal with usable sensitivity from among the high-sensitivity-pixel digital signal and the low-sensitivity-pixel digital signal after the shading correction according to a predetermined determination level, corrects the sensitivity ratio, and outputs the corrected signal.

Figure 5A:
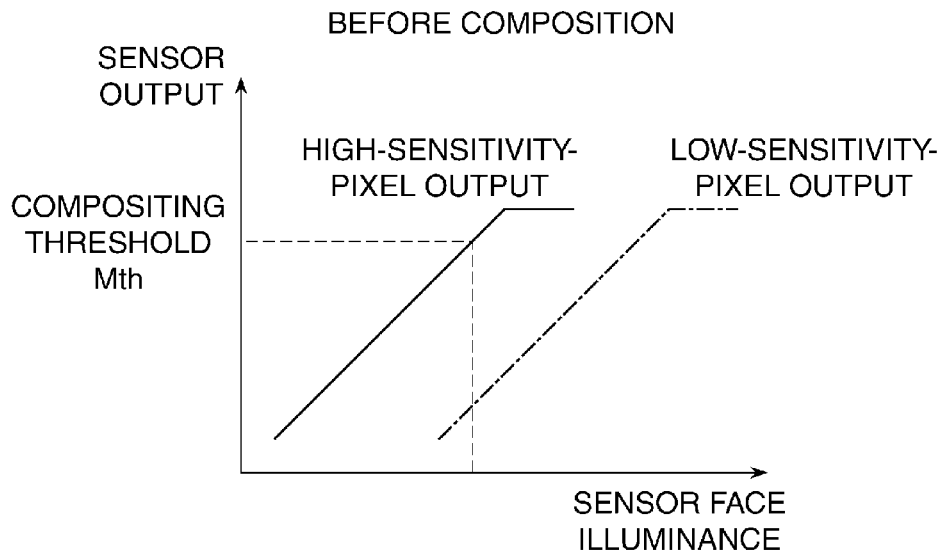
FIG. 5A is a graph showing a relationship between illuminance of a light receiving surface (sensor face) and an output of the image pickup device (sensor) before composition by a compositing circuit shown in FIG. 3.
Figure 5B:
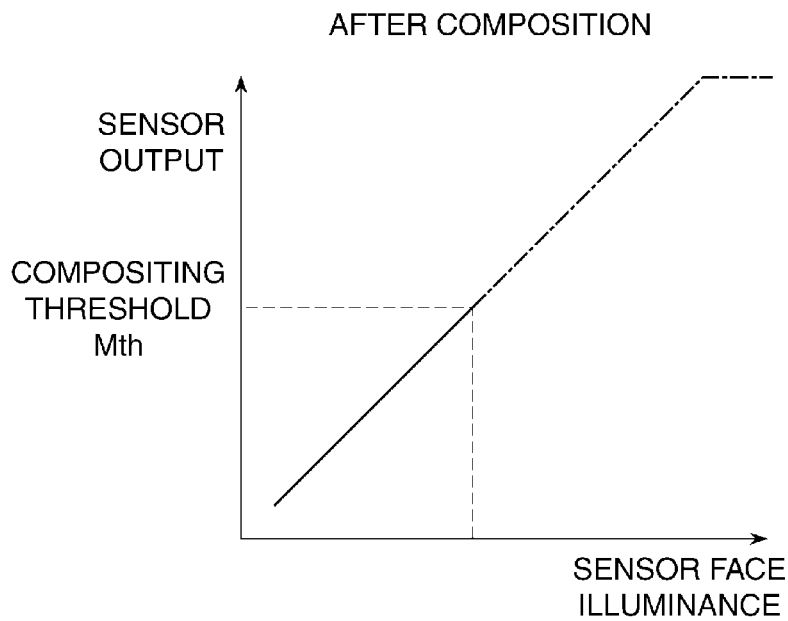
FIG. 5B is a graph showing a relationship between illuminance of the light receiving surface (sensor face) and the output of the image pickup device (sensor) after the composition.

FIG. 5A is a graph showing a relationship between illuminance of the light receiving surface (sensor face) and an output of the image pickup device (sensor) before composition by a compositing circuit 306 shown in FIG. 3. FIG. 5B is a graph showing a relationship between illuminance of the light receiving surface (sensor face) and the output of the image pickup device (sensor) after the composition.

As shown in FIG. 5A, a compositing threshold Mth is set as the determination level in the compositing circuit 36. When the sensor face illuminance is low, the high-sensitivity-pixel digital signal after the shading correction corresponding to the output of the high sensitivity pixel is used. On the other hand, when the sensor face illuminance is high, the low-sensitivity-pixel digital signal after the shading correction corresponding to the output of the low sensitivity pixel is used. This covers a wide dynamic range.

That is, the compositing circuit 36 selects one of the high-sensitivity-pixel digital signal (the high-sensitivity-pixel output shown in FIG. 5A) and the low-sensitivity-pixel digital signal (the low-sensitivity-pixel output shown in FIG. 5A) after the shading correction according to the high-sensitivity-pixel digital signal (reference pixel signal) after addition. Here, the compositing circuit 306 uses the high-sensitivity-pixel output shown in FIG. 5A when the high-sensitivity-pixel output (i.e., level) is lower than the compositing threshold Mth.

On the other hand, when the high-sensitivity-pixel output is not lower than the compositing threshold Mth (i.e., when the output comes near saturation), the compositing circuit 306 uses the low-sensitivity-pixel output. When the low-sensitivity-pixel output is used, it is necessary to correct a sensitivity ratio to the high-sensitivity-pixel output. For example, if the sensitivity of the high sensitivity pixel is 256 times the sensitivity of the low sensitivity pixel, the sensitivity ratio will be corrected by multiplying the low-sensitivity-pixel output by 256.

Accordingly, as shown in FIG. 5B, the compositing circuit 306 generates a unit pixel output, and enlarges the dynamic range in the unit pixel output.

Thus, since the common shading correction data is used, the data volume for the shading correction is reduced, and the shading correction is performed with sufficient accuracy in the first embodiment of the present invention.

Next, a pixel arrangement of an image pickup device according to a second embodiment of the present invention will be described.

Figure 6:
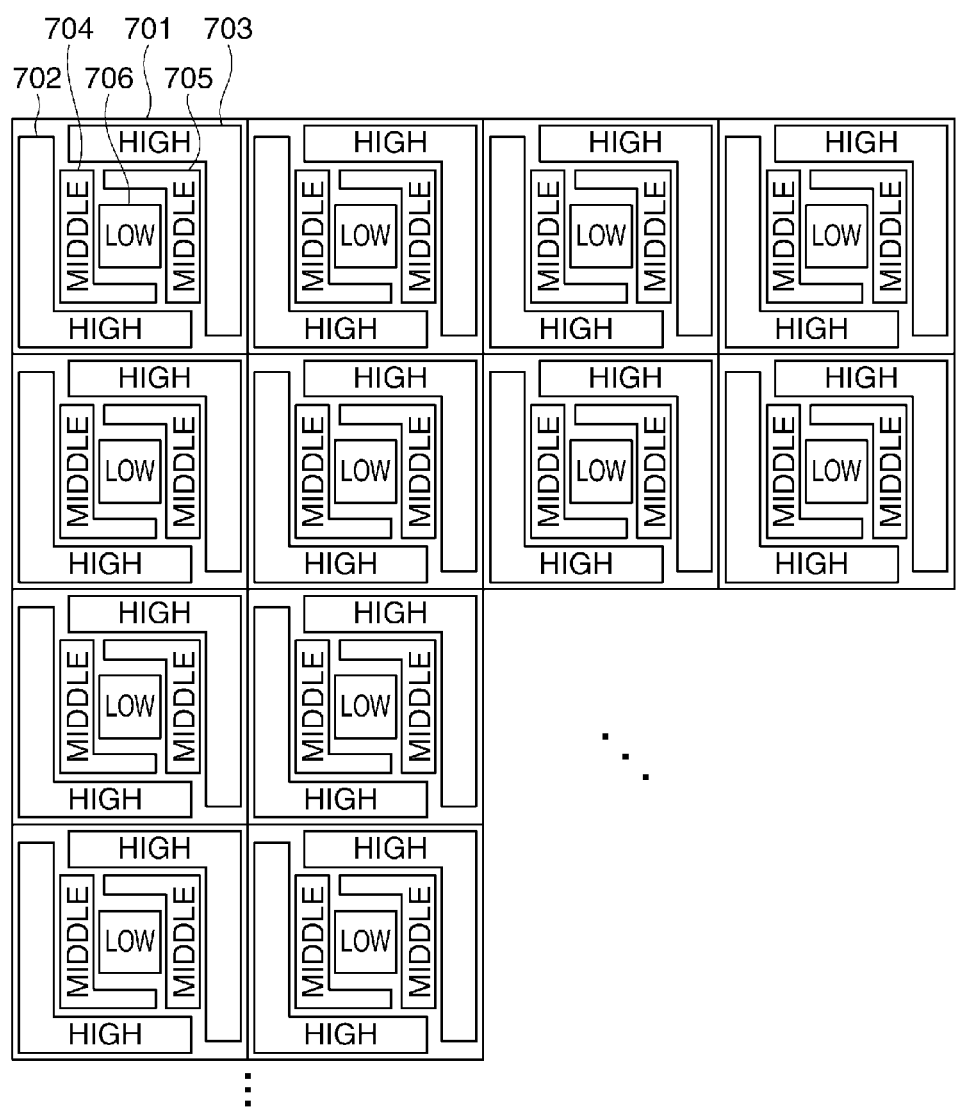
FIG. 6 is a view showing a pixel arrangement of an image pickup device according to a second embodiment of the present invention.

FIG. 6 is a view showing the pixel arrangement of the image pickup device according to the second embodiment of the present invention.

In the image pickup device shown in FIG. 6, a unit pixel 701 consists of high sensitivity pixels (HIGH) 702 and 703, middle sensitivity pixels (MIDDLE) 704 and 705, and a low sensitivity pixel (LOW) 706, which are different in the areas of light receiving sections mutually. The plurality of unit pixels 701 are arranged in a two-dimensional matrix form.

As illustrated, the high sensitivity pixels 702 and 703 have openings (i.e., light receiving sections) having the same areas, and are arranged at peripheries in the unit pixel 701. Moreover, the middle sensitivity pixels 704 and 705 are arranged inside the high sensitivity pixels 702 and 703, respectively. And, the low sensitivity pixel 706 is arranged at the center of the unit pixel 104.

In the example shown in FIG. 6, the high sensitivity pixels 702 and 703, the middle sensitivity pixels 704 and 705, and the low sensitivity pixel 706 are arranged in the unit pixel 701 so that the centroid positions of the high sensitivity pixels, middle sensitivity pixels, and low sensitivity pixel coincide approximately. That is, the centroid position of the high sensitivity pixels 702 and 703 (the centroid position of the united area of the high sensitivity pixels 702 and 703), the centroid position of the middle sensitivity pixels 704 and 705 (the centroid position of the united area of the middle sensitivity pixels 704 and 705), and the centroid position of the low sensitivity pixel 706 coincide approximately.

A processing circuit for the image pickup device shown in FIG. 6 is provided with an A/D converter for every pixel that constitutes a unit pixel, a high-sensitivity-pixel adding circuit, a shading correction circuit, and a compositing circuit as with the processing circuit shown in FIG. 3, and has a middle-sensitivity-pixel adding circuit that adds outputs of the middle sensitivity pixels 704 and 705 in addition. Then, the shading correction circuit performs shading corrections of the high-sensitivity-pixel digital signal after addition (the high-sensitivity-pixel output), middle-sensitivity-pixel digital signal after addition (middle-sensitivity-pixel output), and low-sensitivity-pixel digital signal (low-sensitivity-pixel output) using common shading correction data in the same manner as described with reference to FIG. 4.

Furthermore, this processing circuit has a first compositing threshold Mth1 and a second compositing threshold Mth2 (Mth1<Mth2). The compositing circuit uses the high-sensitivity-pixel output after the shading correction when the high-sensitivity-pixel output after the shading correction is lower than the first compositing threshold Mth1. Moreover, the compositing circuit uses the middle-sensitivity-pixel output after the shading correction when the high-sensitivity-pixel output after the shading correction is not lower than the first compositing threshold Mth1 and is lower than the second compositing threshold Mth2. Then, the compositing circuit uses the low-sensitivity-pixel output after the shading correction when the high-sensitivity-pixel output after the shading correction is not lower than the second compositing threshold Mth2.

In this case, when the middle-sensitivity-pixel output or the low-sensitivity-pixel output is used, the compositing circuit corrects a sensitivity ratio to the high-sensitivity-pixel output in the same manner as the first embodiment.

Figure 7:
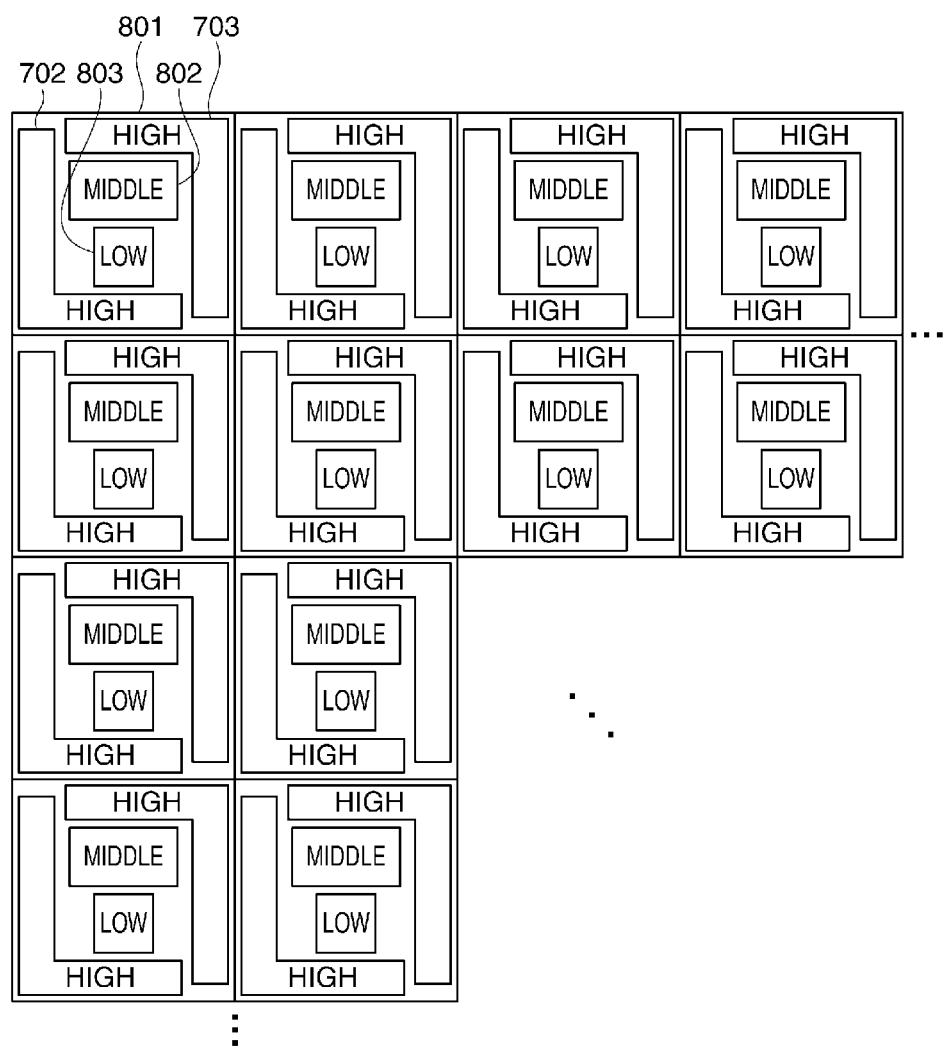
FIG. 7 is a view showing a pixel arrangement of an image pickup device according to a third embodiment of the present invention.

FIG. 7 is a view showing a pixel arrangement of an image pickup device according to a third embodiment of the present invention.

As illustrated, high sensitivity pixels 702 and 703 have openings (i.e., light receiving sections) having the same areas, and are arranged at peripheries in a unit pixel 801. Moreover, a middle sensitivity pixel 702 and a low sensitivity pixel 803 are arranged inside the high sensitivity pixels 702 and 703. In this embodiment, it is so small that difference between centroid positions of the low sensitivity pixel 803 and middle sensitivity pixel 802 can be ignored. In this case, it is not necessary to arrange two middle sensitivity pixels. The high sensitivity pixels 702 and 703, the middle sensitivity pixel 802, and the low sensitivity pixel 803 are arranged in the unit pixel 801 so that the centroid position of the high sensitivity pixels 702 and 703, the centroid position of the middle sensitivity pixel 802, and the centroid position of the low sensitivity pixel 803 coincide approximately.

Thus, even when the unit pixel consists of four or more pixels of which sensitivities differ mutually, the pixels are arranged so that the centroid positions of the pixels of which sensitivities differ coincide approximately.

A processing circuit for the image pickup device shown in FIG. 7 is provided with an A/D converter for every pixel that constitutes a unit pixel, a high-sensitivity-pixel adding circuit, a shading correction circuit, and a compositing circuit as with the processing circuit shown in FIG. 3. Then, the shading correction circuit performs shading corrections of the high-sensitivity-pixel output, middle-sensitivity-pixel output, and low-sensitivity-pixel output using common shading correction data in the same manner as described with reference to FIG. 4.

Furthermore, this processing circuit has a first compositing threshold Mth1 and a second compositing threshold Mth2 (Mth1<Mth2). The compositing circuit uses the high-sensitivity-pixel output after the shading correction when the high-sensitivity-pixel output after the shading correction is lower than the first compositing threshold Mth1. Moreover, the compositing circuit uses the middle-sensitivity-pixel output after the shading correction when the high-sensitivity-pixel output after the shading correction is not lower than the first compositing threshold Mth1 and is lower than the second compositing threshold Mth2. Then, the compositing circuit uses the low-sensitivity-pixel output after the shading correction when the high-sensitivity-pixel output after the shading correction is not lower than the second compositing threshold Mth2. In this case, when the middle-sensitivity-pixel output or the low-sensitivity-pixel output is used, the compositing circuit corrects a sensitivity ratio to the high-sensitivity-pixel output in the same manner as the first embodiment.

Figure 8:
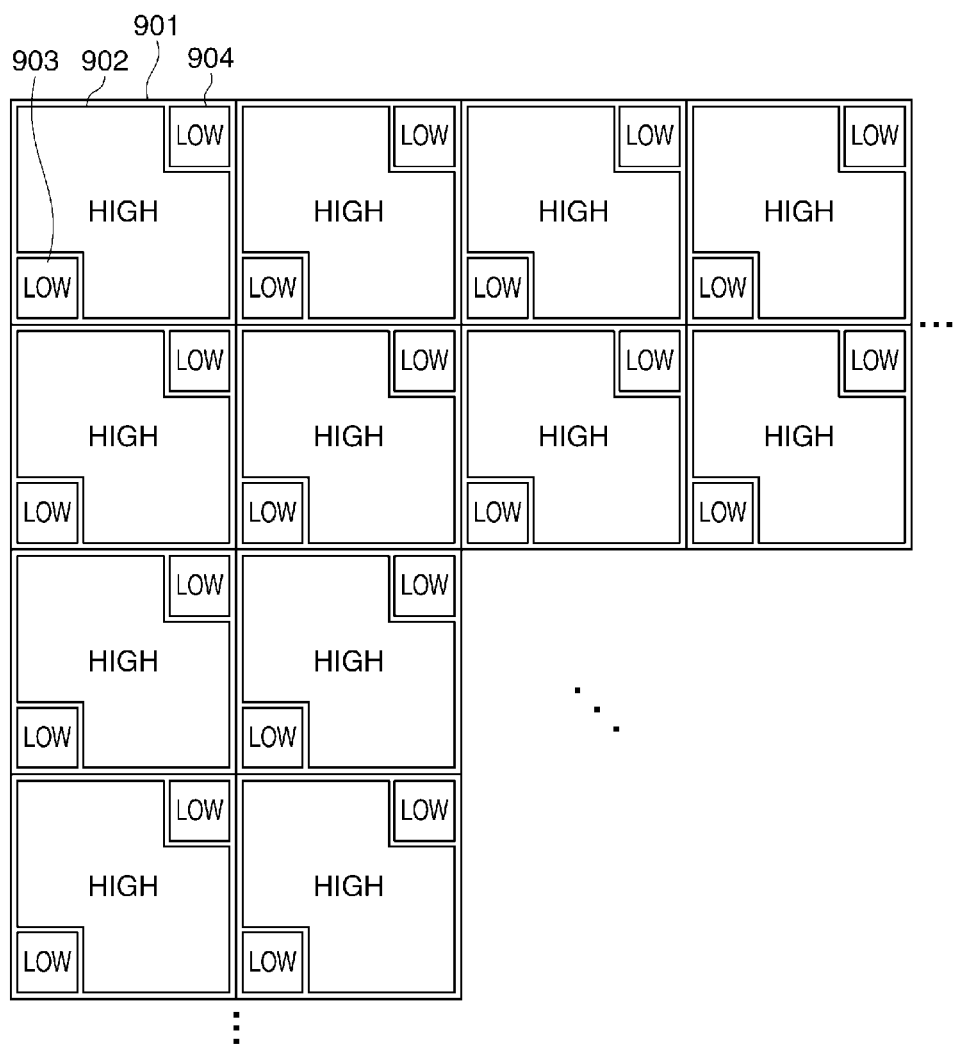
FIG. 8 is a view showing a pixel arrangement of an image pickup device according to a fourth embodiment of the present invention.

FIG. 8 is a view showing a pixel arrangement of an image pickup device according to a fourth embodiment of the present invention.

In the image pickup device shown in FIG. 8, a unit pixel 901 consists of a high sensitivity pixel (HIGH) 902 and low sensitivity pixels (LOW) 903 and 904, which are different in the areas of light receiving sections mutually. The plurality of unit pixels 901 are arranged in a two-dimensional matrix form.

As illustrated, the low sensitivity pixels 903 and 904 have openings (i.e., light receiving sections) having the same areas, and are arranged at corners in the unit pixel 901. Moreover, the high sensitivity pixel 902 is arranged in an area except the low sensitivity pixels 903 and 904.

Figure 9:
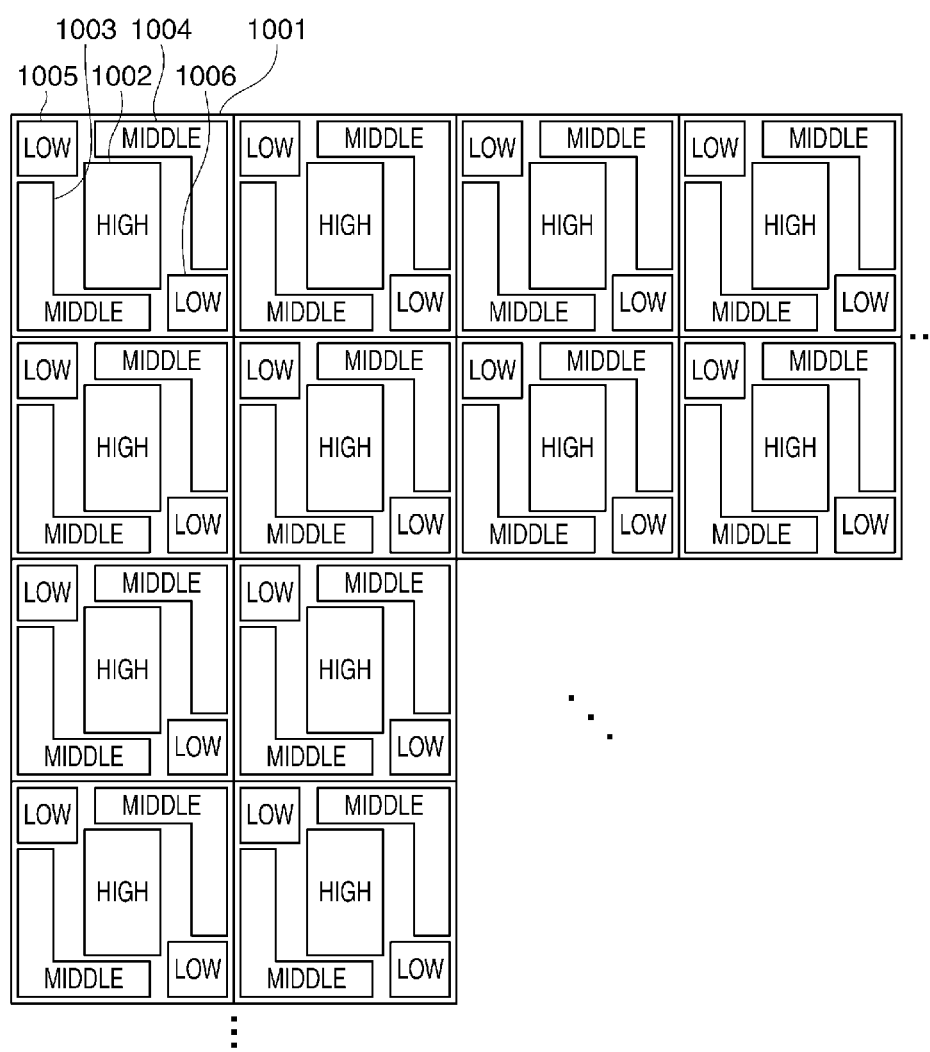
FIG. 9 is a view showing a pixel arrangement of an image pickup device according to a fifth embodiment of the present invention.
Figure 10:
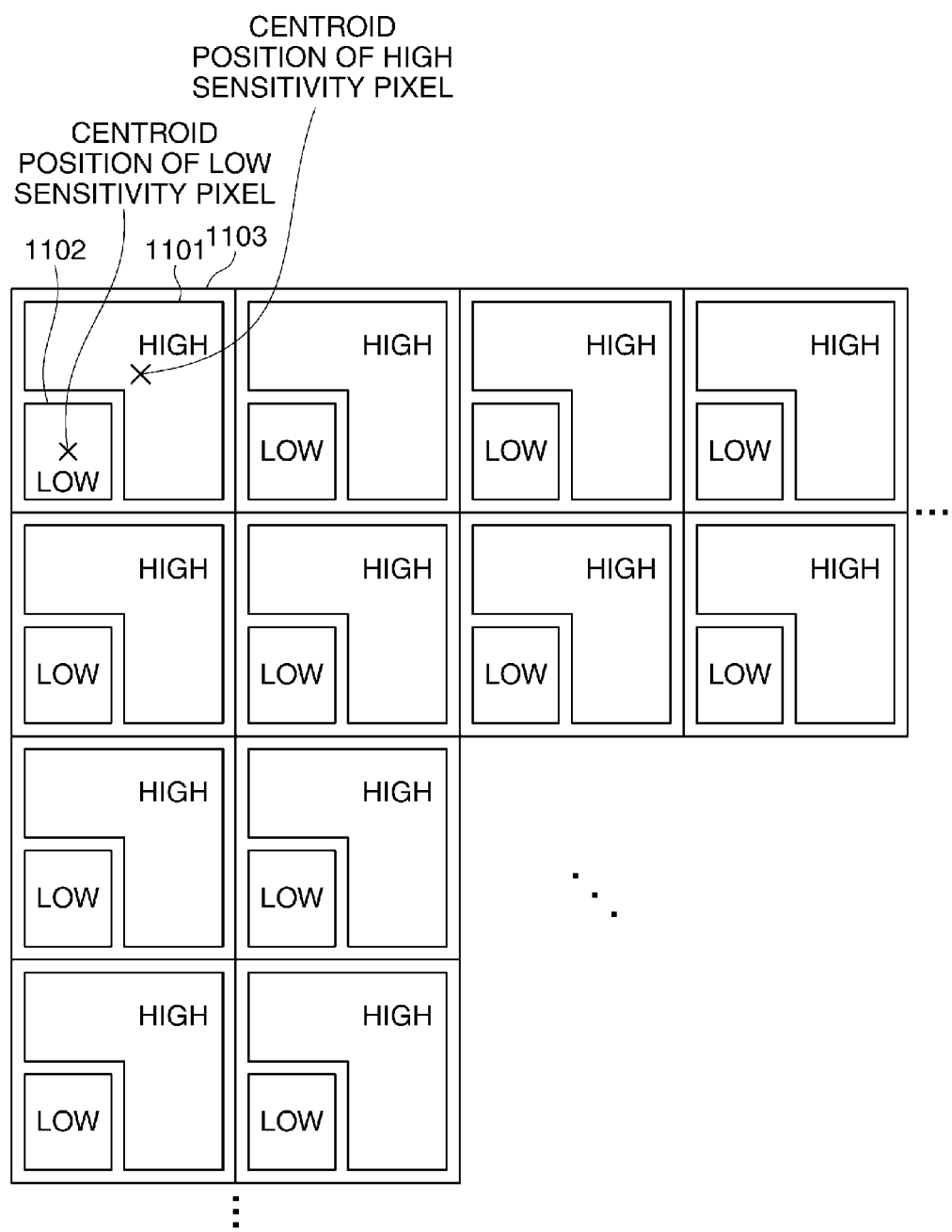
FIG. 10 is a view showing the pixel arrangement of the conventional image pickup device.

Also in the example shown in FIG. 9, the high sensitivity pixel 902 and the low sensitivity pixels 903 and 904 are arranged in the unit pixel 901 so that the centroid position of the high sensitivity pixel 902 and the centroid position of the low sensitivity pixels 903 and 904 (the centroid position of the united area of the low sensitivity pixels 903 and 904) coincide approximately.

A processing circuit is provided with a low-sensitivity-pixel adding circuit that adds the outputs (after an A/D conversion) of the low sensitivity pixels 903 and 904 instead of the high-sensitivity-pixel adding circuit 304 shown in FIG. 3. It should be noted that the descriptions about operations of the shading correction circuit and compositing circuit are omitted because the operations are identical to that in the above-mentioned descriptions.

FIG. 9 is a view showing a pixel arrangement of an image pickup device according to a fifth embodiment of the present invention.

In the image pickup device shown in FIG. 9, a unit pixel 1001 consists of a high sensitivity pixel (HIGH) 1002, middle sensitivity pixels (MIDDLE) 1003 and 1004, and low sensitivity pixels (LOW) 1005 and 1006, which are different in the areas of light receiving sections mutually. The plurality of unit pixels 1001 are arranged in a two-dimensional matrix form.

As illustrated, the middle sensitivity pixels 1003 and 1004 have openings (i.e., light receiving sections) having the same areas, and similarly, the low sensitivity pixels 1005 and 1006 have openings having the same areas. The low sensitivity pixels 1005 and 1006 are arranged at corners of the unit pixel 1001, and the middle sensitivity pixels 1003 and 1104 are arranged in the peripheral areas except the low sensitivity pixels 1005 and 1006 in the unit pixel 1001. And, the high sensitivity pixel 1002 is arranged at the center of the unit pixel 1001.

In the example shown in FIG. 9, the high sensitivity pixel 1002, the middle sensitivity pixels 1003 and 1004, and the low sensitivity pixels 1005 and 1106 are arranged in the unit pixel 1001 so that the centroid position of the high sensitivity pixel 1002, the centroid position of the middle sensitivity pixels 1003 and 1004, and the centroid position of the low sensitivity pixels 1005 and 1006 coincide approximately.

A processing circuit is provided with a middle-sensitivity-pixel adding circuit that adds the outputs (after an A/D conversion) of the middle sensitivity pixels 1003 and 1004, and a low-sensitivity-pixel adding circuit that adds the outputs (after an A/D conversion) of the low sensitivity pixels 1005 and 1006 instead of the high-sensitivity-pixel adding circuit 304 shown in FIG. 3. It should be noted that the descriptions about operations of the shading correction circuit and compositing circuit are omitted because the operations are identical to that in the above-mentioned descriptions.

As mentioned above, the embodiments of the present invention enable to perform the shading correction without increasing data volume of the shading correction data that is used at the time of the shading correction in the image pickup device in which unit pixels having at least two pixels each of which are different in the areas of light receiving sections mutually are arranged.

The shading correction process and the composition process are performed by the signal processing circuit built in the image pickup device in the above-mentioned embodiments. It should be noted that the shading correction process and the composition process may not be performed by the signal processing circuit built in the image pickup device. For example, the shading correction process and the composition process may be performed by a signal processing circuit in an image pickup apparatus in which the image pickup device is mounted.

Although the embodiments of the invention have been described, the present invention is not limited to the above-mentioned embodiments, the present invention includes various modifications as long as the concept of the invention is not deviated.

For example, the functions of the above mentioned embodiments may be achieved as a control method that is executed by an image pickup device. Moreover, a control program having the functions of the above mentioned embodiments may be executed by a computer. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-105213, filed May 21, 2014, which is hereby incorporated by reference herein in its entirety.

What is claimed is:

1. An image pickup apparatus comprising:
an image pickup device in which a plurality of unit pixels are arranged in a two-dimensional matrix form, each of the plurality of unit pixels including:
a plurality of first sensitivity pixels, which are arranged at a periphery of the unit pixel, each first sensitivity pixel configured to have a first sensitivity based on a first light receiving area; and
at least one second sensitivity pixel configured to have a second sensitivity based on a second light receiving area smaller than a total area of the first light receiving areas of the plurality of first sensitivity pixels included in the unit pixel, wherein the first light receiving areas of each of the first sensitivity pixels of each unit pixel differ in size and form from the second light receiving area of the second sensitivity pixel of the respective unit pixel;
an adding circuit configured to add pixel signals that are outputs of the plurality of first sensitivity pixels such that the centroid position of the total area of the first light receiving areas of the plurality of first sensitivity pixels included in the unit pixel approximately coincides with a centroid position of the second light receiving area of the at least one second sensitivity pixel; and
a correction circuit configured to correct an added first sensitivity pixel signal having undergone addition by the adding circuit and a second sensitivity pixel signal of the at least one second sensitivity pixel based on preset common shading correction data.

2. The image pickup apparatus according to claim 1, wherein each of the plurality of unit pixels further comprises at least one third sensitivity pixel configured to have a third sensitivity different from the first and second sensitivities based on a third light receiving area and to be arranged inside of the plurality of first sensitivity pixels so that a centroid position of the third light receiving area of the at least one third sensitivity pixel approximately coincides with the centroid position of the total area of the first light receiving area of the plurality of first sensitivity pixels and the centroid position of the second light receiving area of the at least one second sensitivity pixel.

3. The image pickup apparatus according to claim 2, wherein the correction circuit is further configured to correct a pixel signal of the at least one third sensitivity pixel based on preset common shading correction data.

4. The image pickup apparatus according to claim 3, further comprising AD converters which correspond to the plurality of first sensitivity pixels, the at least one second sensitivity pixel and the at least one third sensitivity pixel respectively, and the adding circuit is configured to add the pixel signals that are the outputs of the plurality of first sensitivity pixels converted to digital signals by the AD converters.

5. The image pickup apparatus according to claim 1, wherein the shading correction data is generated according to a light amount ratio of a unit pixel to a reference pixel that is the brightest pixel in a case where a predetermined uniform luminance surface is photographed with a camera in which the image pickup device is mounted.

6. The image pickup apparatus according to claim 1, further comprising a compositing circuit configured to receive corrected pixel signals having undergone shading correction by the correction circuit and to composite the corrected pixel signals to use as an output of the unit pixel.

7. The image pickup apparatus according to claim 6, wherein said compositing circuit uses a reference pixel signal that is one of the corrected pixel signals as the output of the unit pixel in a case where the level of the reference pixel signal is lower than a predetermined compositing threshold, and uses another pixel signal except the reference pixel signal as the output of the unit pixel in a case where the level of the reference pixel signal is not lower than the compositing threshold.

8. The image pickup apparatus according to claim 7, wherein said compositing circuit corrects a sensitivity of the other pixel signal in a case where the other pixel signal is used as the output of the unit pixel.

9. The image pickup apparatus according to claim 7, wherein the reference pixel signal is an output of a pixel with the highest sensitivity.

10. The image pickup apparatus according to claim 1, further comprising AD converters which correspond to the plurality of first sensitivity pixels and the at least one second sensitivity pixel,
wherein the adding circuit is configured to add the pixel signals that are the outputs of the plurality of first sensitivity pixels converted to digital signals by the AD converters.

11. A control method for an image pickup apparatus comprising an image pickup device in which a plurality of unit pixels are arranged in a two-dimensional matrix, each of the plurality of unit pixels including a plurality of first sensitivity pixels, which are arranged at a periphery of the unit pixel, each first sensitivity pixel configured to have a first sensitivity based on a first light receiving area, and at least one second sensitivity pixel having a second sensitivity based on a second light receiving area smaller than a total area of the first light receiving areas of the plurality of first sensitivity pixels included in the unit pixel, the control method comprising:

an adding step of adding pixel signals that are outputs of the plurality of first sensitivity pixels such that the centroid position of the total area of the first light receiving areas of the plurality of first sensitivity pixels included in the unit pixel approximately coincides with a centroid position of the second light receiving area of the at least one second sensitivity pixel;

a correction step of correcting an added first sensitivity pixel signal having undergone addition in the adding step and a second sensitivity pixel signal of the at least one second sensitivity pixel based on preset common shading correction data; and a compositing step of receiving corrected pixel signals having undergone shading correction in said correction step, and of compositing the corrected pixel signals to use as an output of the respective unit pixel, wherein the first light receiving areas of each of the first sensitivity pixels of each unit pixel differ in size and form from the second light receiving area of the second sensitivity pixel of the respective unit pixel.

12. A non-transitory computer-readable storage medium storing a control program causing a computer to execute a control method for an image pickup apparatus comprising an image pickup device in which a plurality of unit pixels are arranged in a two-dimensional matrix, each of the plurality of unit pixels including a plurality of first sensitivity pixels, which are arranged at a periphery of the unit pixel, each first sensitivity pixel configured to have a first sensitivity based on a first light receiving area, and at least one second sensitivity pixel having a second sensitivity based on a second light receiving area smaller than a total area of the first light receiving areas of the plurality of first sensitivity pixels included in the unit pixel, the control method comprising:

an adding step of adding pixel signals that are outputs of the plurality of first sensitivity pixels such that the centroid position of the total area of the first light receiving areas of the plurality of first sensitivity pixels included in the unit pixel approximately coincides with a centroid position of the second light receiving area of the at least one second sensitivity pixel;

a correction step of correcting an added first sensitivity pixel signal having undergone addition in the adding step and a second sensitivity pixel signal of the at least one second sensitivity pixel based on preset common shading correction data; and a compositing step of receiving corrected pixel signals having undergone shading correction in said correction step, and of compositing the corrected pixel signals to use as an output of the respective unit pixel, wherein the first light receiving areas of each of the first sensitivity pixels of each unit pixel differ in size and form from the second light receiving area of the second sensitivity pixel of the respective unit pixel.

* * * * *